No. 850,748. PATENTED APR. 16, 1907.
I. W. GILES & C. W. TOBEY.
RUBBER TIRE FASTENER.
APPLICATION FILED SEPT. 14, 1906.
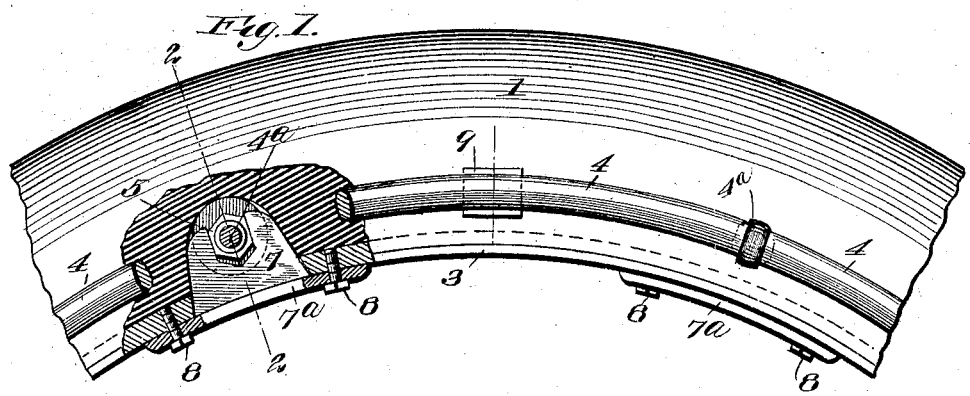
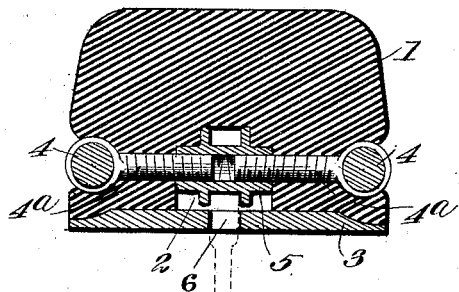
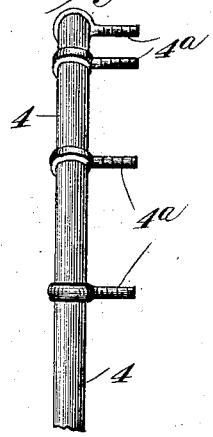
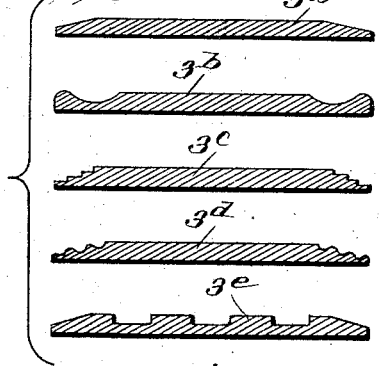
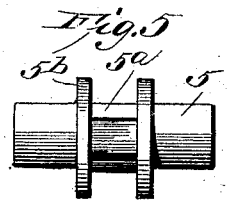
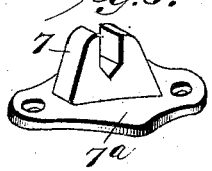
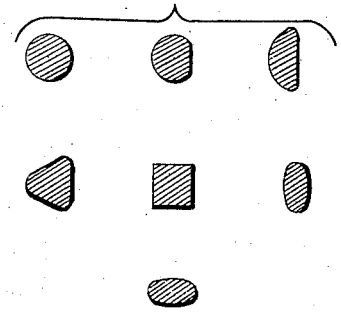
WITNESSES
E. M. Callaghan
Amos W. Hart
INVENTORS
ISAAC W. GILES
CHARLES W. TOBEY
BY Munn & Co.
ATTORNEYS
THE NORRIS PETERS CO., WASHINGTON, D. C.

UNITED STATES PATENT OFFICE.

ISAAC W. GILES, OF NEW BEDFORD, AND CHARLES W. TOBEY, OF FAIRHAVEN, MASSACHUSETTS.

RUBBER-TIRE FASTENER.

No. 850,748.  Specification of Letters Patent.  Patented April 16, 1907.

Application filed September 14, 1906. Serial No. 334,686.

*To all whom it may concern:*

Be it known that we, ISAAC W. GILES, of New Bedford, in the county of Bristol and State of Massachusetts, and CHARLES W. TOBEY, of Fairhaven, in the county of Bristol and State of Massachusetts, have invented an Improved Rubber-Tire Fastener, of which the following is a specification.

Our invention is an improvement in means for securing rubber tires to iron or other tires or rims of vehicle and other wheels.

The details of construction, arrangement, and operation of parts are as hereinafter described, and illustrated in the accompanying drawings, in which—

Figure 1 is mainly a side view of a section of a wheel-rim, a portion being shown in section for better illustration of our improved fastener. Fig. 2 is a cross-section on the line 2 2 of Fig. 1. Fig. 3 is a side or edge view of a portion of the annular rods or wires forming the main feature of our improved fastener. Fig. 4 includes a series of cross-sections of different forms of iron tires forming a part of our invention. Fig. 5 is a side view of the sleeve-nut forming a part of the fastener. Fig. 6 is a perspective view of the holder or device for locking the sleeve-tube. Fig. 7 includes a series of cross-sections of different forms of rods or wires such as illustrated in Fig. 3. Fig. 8 is a detail section, and Fig. 9 is a plan view showing teeth applied to the devices which compress the elastic tire.

1 indicates a solid rubber tire, which is constructed with a series of cavities 2 in its inner side, as shown in Fig. 2, and 3 (see Figs. 1 and 2) is an iron tire, upon which the rubber tire rests. It will be understood that the iron tire is in practice connected with the hub of a wheel by means of wire or other spokes in the usual manner. The rubber tire 1 is secured upon the iron tire 3 by the following means: An annular rod or stout wire 4 (see Figs. 1, 2, 3) is applied to each side of the rubber tire and is provided with a series of threaded studs $4^a$, that project horizontally from its inner side. These studs pass through the portions of the rubber tire which are directly opposite the recesses 2, and the studs of the opposite rods 4 are in alinement, as shown in Fig. 4. Such alined studs are connected by the threaded sleeve 5. (See Figs. 2 and 5.) The same is shown provided with a central polygonal or squared portion $5^a$ and with two circumferential flanges $5^b$.

The iron tire 3 is provided at points directly opposite the recesses 2 in the rubber tire 1 with openings 6 (see Fig. 2) for reception of a wrench or tool adapted for rotating the nut 5, the wrench being inserted as indicated by dotted lines, Fig. 2. The nut is threaded right and left, so that when rotated in the proper direction it will draw the studs $4^a$ nearer to each other, and thus cause the side rods 4 to compress and sink into the sides of the rubber tire 1, as plainly shown in Fig. 2. On the other hand, by rotating the sleeve-nut 5 in the opposite direction the studs will be allowed to slide outward, so that the compressing-rods 4 may be entirely detached, thus allowing detachment of the tire 1 from the iron tire 3. When the nut 5 has been screwed up and the sides of the rubber tire 1 compressed, as shown in Fig. 2, it is requisite that the nut should be held from rotation or locked immovable, and for this purpose we employ the device shown in Figs. 1 and 6. The same is in the nature of a lug 7, having a notch with parallel sides separated sufficiently to receive the polygonal portion $5^a$ of the nut, as indicated in Fig. 1, and a base-flange $7^a$, having its ends perforated to receive screws 8, (see Fig. 1,) by which the device is secured to the inner side of the iron tire, the notched lug 7 in such case projecting through the opening 6 in the latter. The locking device 7 performs another function in that it fits between the flanges $5^b$ of the sleeve-nut, and thus prevents the same moving laterally, and since the ends of the nut, as well as the outer portion of its flanges, abut the sides of the recess 2 in the tire 1 it is obvious that lateral displacement of the latter is practically impossible Another feature of our invention lies in the construction of the iron tire with grooves or depressions, as illustrated in Figs. 2 and 4. In Fig. 1 the tire 3 is shown reduced on the outer side adjacent to the edges, thus forming what may be termed "shoulders," that are engaged by the inner or base portion of the rubber tire when the same is compressed by the rods 4 and nuts 5, as already described. The first section $3^a$ in Fig. 4 is nearly the same as the section shown in Fig. 2. The second section $3^b$ shows circumferential grooves formed in the iron tire adjacent to its ends, and the third section 3ᶜ illustrates a series of annular or circumferential shoulders formed at or adjacent to the edges of the tire. The fourth section 3ᵈ is a modification of the third, 3ᶜ, the tire being in this case provided with a series of annular or circumferential ribs and grooves, which are curvilinear instead of being annular as in the third section. The last or fifth section 3ᵉ shows a tire having its edges chamfered on the outer side similar to the first section 3ᵃ and provided intermediate with circumferential grooves and intervening ribs. It will be understood that in all these instances of the construction of the rubber tire the same sinks into the depressed or reduced portions, so that it takes a very firm hold on the iron tire and is thus adapted to resist any possible lateral strain incident to use.

In Fig. 7 we illustrate a number of different forms which the compressing side rods 4 may have in cross-section.

In Figs. 8 and 9 we illustrate a lateral enlargement or projection of the rods 4, the same consisting of a semicircular rib 9, the same being formed on or attached to the inner sides of rods 4 at various points in their length, and thus serving as so many teeth that enter the soft rubber of the tire 1 and as additional means for holding the rubber from slipping outward. In brief, the projections or teeth 9 form holders supplemental to the threaded studs 4ᵃ for forming a secure connection between the tire 1 and rods 4. As shown, the central portion of the ribs 9 projects for the purpose of producing a still firmer hold. The studs 4ᵃ are preferably mounted loose on the rods 4 instead of being immovable therein, since this arrangement permits them to more readily adjust themselves to place.

What we claim is—

1. The combination, with an iron tire and a rubber tire applied thereto, of means for compressing the latter and holding it securely on said iron tire, the same comprising annular side rods having interiorly-projecting threaded studs, and a sleeve-nut connecting the inner ends of alined studs, the iron tire having openings opposite such nuts to permit the application of a wrench for rotating the latter, substantially as described.

2. The combination, with the rim of a vehicle-wheel, of an elastic tire applied thereto and having interior recesses, compressing-rods arranged on the sides of the tire, and a device connecting said rods and arranged in the said recesses, substantially as described.

3. The combination, with a wheel rim or tire, of an elastic tire applied thereto, rods arranged on the sides of the elastic tire and having inwardly-projecting threaded studs, nuts connecting the inner ends of the studs and serving as means for adjusting the pressure of the rods on the tire, and a device projecting through the inner rim or tire and engaging the nut, for locking it against rotation, substantially as described.

4. The combination, with the inner rim or tire and an elastic tire applied thereto and having interior recesses, of rods mounted on the sides of the elastic tire and having inwardly-projecting threaded studs, a nut arranged in each of the said recesses and portions of the nut being in contact with the lateral sides of the recess, and a device projecting through the inner rim or tire and engaging the nut whereby its lateral movement is prevented, substantially as described.

5. The combination, with a wheel rim or tire, of an elastic tire applied thereto and having interior recesses, of compressing devices arranged in the sides of the elastic tire, means arranged between and connecting said devices, and means for preventing lateral movement of the tire and its compressing devices, substantially as described.

6. The combination, with a wheel-rim having a series of central openings and an elastic tire applied thereto and having a corresponding series of interior recesses, of compressing devices arranged on the sides of the elastic tire, threaded studs projecting inward therefrom, a sleeve-nut applied to the alined studs and having a central polygonal portion, and a locking device consisting of a slotted lug projecting through the openings in the tire and engaging the polygonal portion of the nut, and means for securing the locking device to the tire, substantially as described.

7. The combination, with a wheel having an inner rim or tire and an elastic tire applied thereto, of rods arranged on the sides of the elastic tire, and provided with ribs or teeth which take into the body of the tire, and means for connecting the opposite rods and adjusting their pressure upon the elastic tire, substantially as described.

ISAAC W. GILES.
CHARLES W. TOBEY.

Witnesses:
ROBERT BETAGH,
ARTHUR L. SIMMONS.